US006757905B1

(12) United States Patent
Friedman et al.

(10) Patent No.: US 6,757,905 B1
(45) Date of Patent: *Jun. 29, 2004

(54) METHOD AND SYSTEM FOR SYNCHRONOUS OPERATION OF LINKED COMMAND OBJECTS

(75) Inventors: Gregory S. Friedman, San Francisco, CA (US); Thomas W. Becker, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 680 days.

This patent is subject to a terminal disclaimer.

(21) Appl. No.: 09/664,867

(22) Filed: Sep. 19, 2000

Related U.S. Application Data

(63) Continuation of application No. 08/435,719, filed on May 5, 1995, now Pat. No. 6,167,455.

(51) Int. Cl.$^7$ .............................. G06F 9/00; G06F 9/46
(52) U.S. Cl. ..................................................... 719/320
(58) Field of Search ................................ 709/320, 310; 719/320, 328, 310; 715/515, 530; 345/804, 769; 714/39, 25

(56) References Cited

U.S. PATENT DOCUMENTS

| | | | |
|---|---|---|---|
| 5,263,167 A | 11/1993 | Conner, Jr. et al. | 395/700 |
| 5,307,451 A | 4/1994 | Clark | 395/127 |
| 5,416,900 A | 5/1995 | Blanchard et al. | 395/155 |
| 5,455,599 A | 10/1995 | Cabral et al. | 345/133 |
| 5,459,832 A | 10/1995 | Wolf et al. | 395/155 |
| 5,481,710 A | 1/1996 | Keane et al. | 395/700 |
| 5,519,862 A | 5/1996 | Schaeffer et al. | 395/650 |
| 5,522,029 A | 5/1996 | Hatfield | 395/181 |
| 5,530,859 A | 6/1996 | Tobias, II et al. | 395/650 |
| 5,530,864 A | 6/1996 | Matheny et al. | 395/700 |
| 5,560,012 A | 9/1996 | Ryu et al. | 395/700 |
| 5,566,294 A | 10/1996 | Kojima et al. | 395/159 |
| 5,604,853 A | 2/1997 | Nagashima | 395/803 |
| 5,659,747 A | 8/1997 | Nakajima | 395/651 |
| 6,167,455 A | * 12/2000 | Friedman et al. | 709/320 |

OTHER PUBLICATIONS

Berlage, T., and Genau A., "From Undo to Multi–User Applications," Human Computer Interaction, Proceedings—Vienna Conference, VCHCI '93, Sep. 20–22, 1993.

(List continued on next page.)

*Primary Examiner*—Sue Lao
(74) *Attorney, Agent, or Firm*—Fenwick & West LLP

(57) ABSTRACT

A system and method provide for synchronous operation of linked command objects in a general purpose software application. The software application provides a user with a variety of operations that manipulate available data objects. The software application manages the data objects in a number of contexts. Each context manages the existence and execution of a number of command objects. Each command object operates on one or more data objects in its context. To support synchronous operations that affect the state of data objects in more than one context, command objects are linked to each other. When one command object is executed, the context of the command object identifies a command object linked to the executed command object and initiates the execution of the linked command object via the context that manages that command object. This synchronization allows for synchronous undo and redone operations. The delete states of the command objects are also synchronized. Deleting a command object destroys it, and prevents it from being undone. When one command object is deleted the command object linked thereto is also deleted, thereby preventing the linked command object from being independently undone resulting in an inconsistent state of the contexts.

25 Claims, 9 Drawing Sheets

OTHER PUBLICATIONS

Macgragor, M.D., "Developing MacApp Applications," Journal of Object–Oriented Programming, vol. 4, No. 8, pp. 14–22, Jan. 1992.

Meyer, B., "Orject–Oriented Design: Case Studies," Object–Oriented Software Construction, Prentice Hall International (UK) Ltd., Chapter 12, pp. 281–290, 1988.

Piersol, K., "Building and Opendoc Part Handler," MacTech Magazine, Sep. 1994, [retrieved on Aug. 2, 1999]. Retrieved from the Internet: <URL: http://www.netprolive.com/articles/develop/issue_19/006–016_Piersol.html.>.

Stritzinger, A., "Smallkit: A Slim Application Framework," Journal of Object–Oriented Programming, vol. 4, No. 6, pp. 11–18, Oct. 1991.

Wang, H., and Green, M., "An Event–Object Recovery Model for Object–Oriented User Interfaces," UIST'91, pp. 107–115, Nov. 11–13, 1991.

* cited by examiner

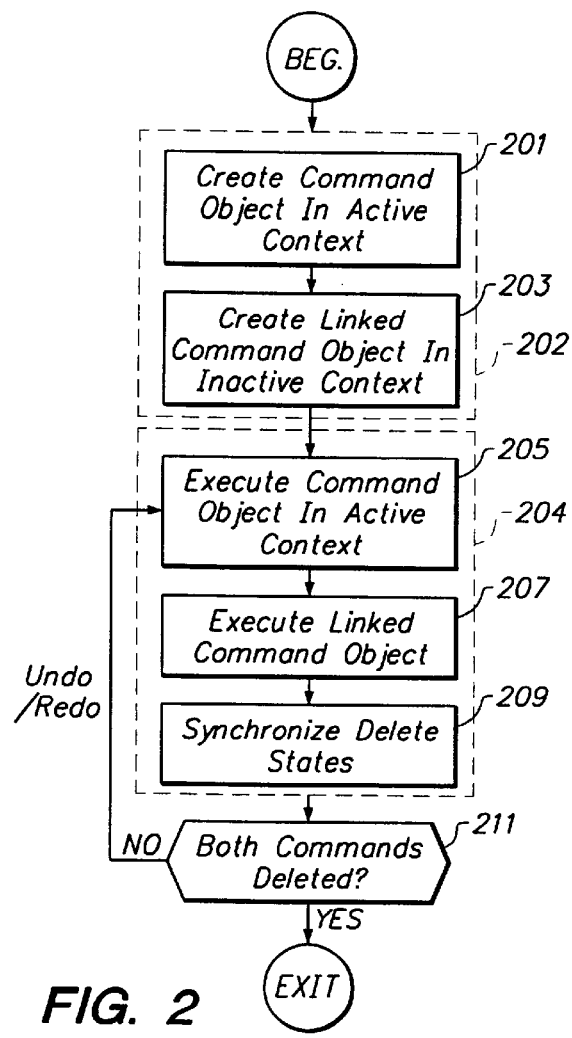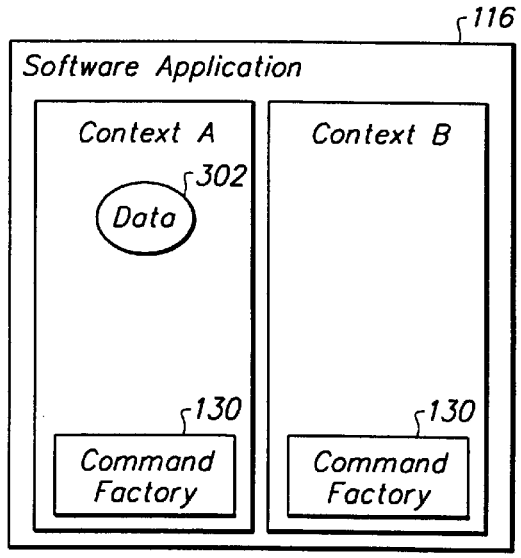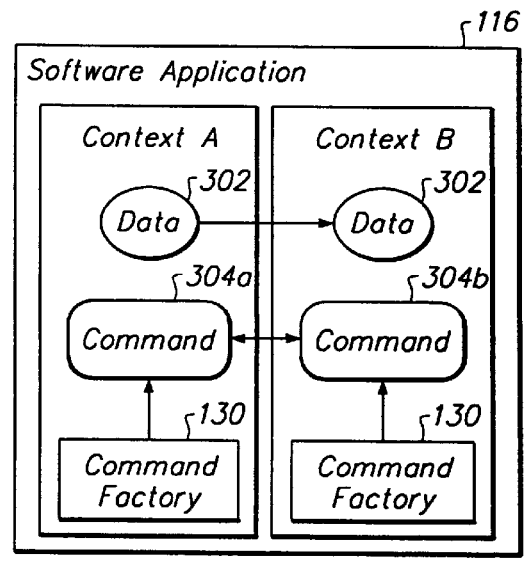
FIG. 2
FIG. 3A  FIG. 3B

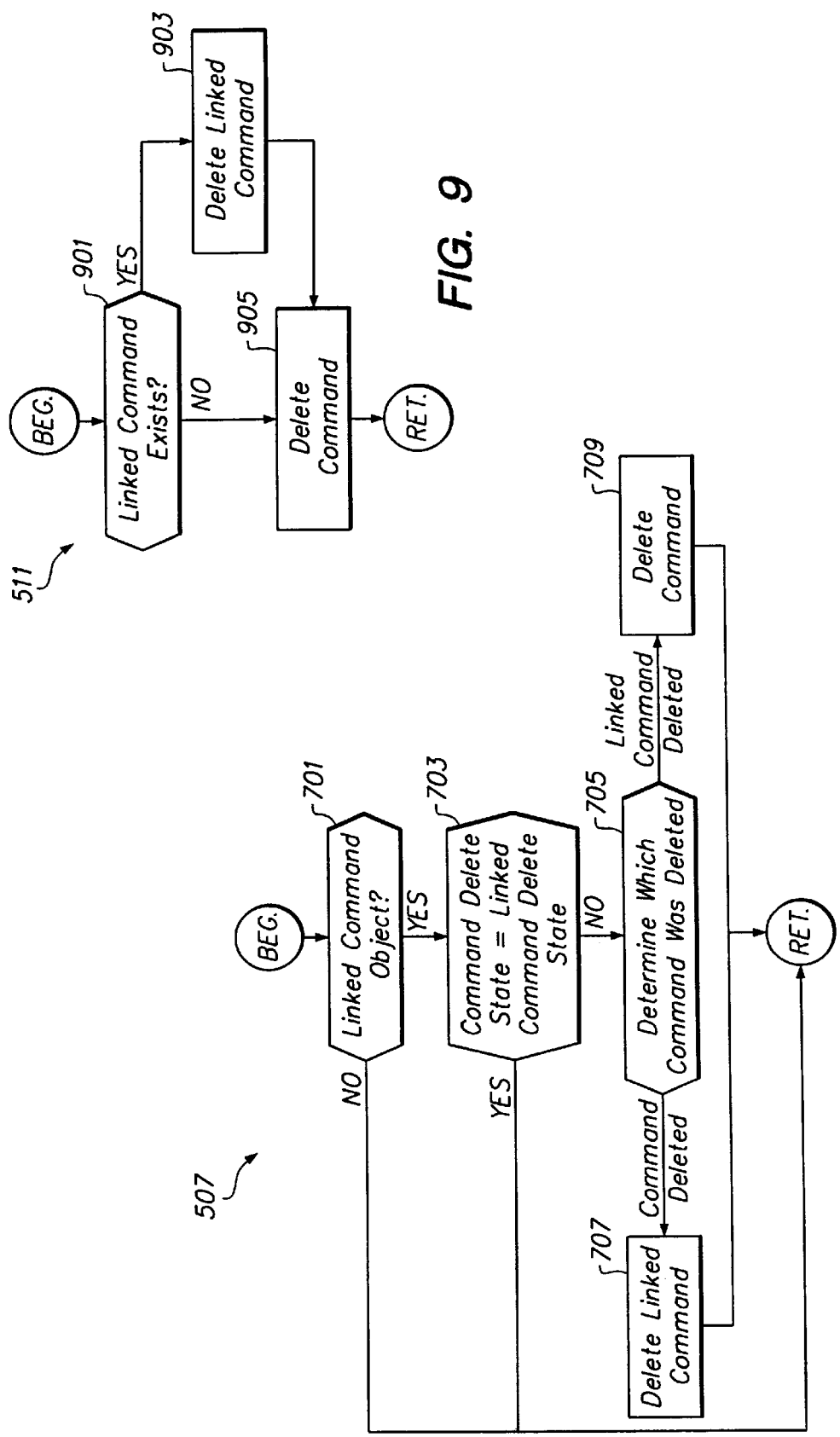

METHOD AND SYSTEM FOR SYNCHRONOUS OPERATION OF LINKED COMMAND OBJECTS

This application is a continuation of application Ser. No. 08/435,719, filed May 5, 1995, now U.S. Pat. No. 6,167,455.

BACKGROUND

1. Field of Invention

This invention relates to the field of application development, and more particularly, to methods and systems that manage the behavior of multiple commands to provide synchronous operation of associated commands.

2. Background of Invention

A typical software application provides a user with a variety of operations that can be executed on the various types of data employed by the application. Each transforms one or more data objects in one or more contexts. A context is a mechanism for representing data to the user. Contexts include documents, windows, text entry fields, dialog boxes, pictures, and the like.

In an application based on an object oriented architecture, each user-level operation may be represented by any number of underlying command objects, each of which manages a specific function on a specific target data object(s) in a specific context. After a command object is executed on a given context, it is typically maintained until a new command object is created in order to execute another user action. Where an action affects more than one context, it is preferable that the command objects operating on the individual data objects be performed synchronously, thereby preserving to the user the appearance in the user interface of a single action.

One example of synchronous commands is the use of drag and drop actions in a graphical user interface, typically under the control of a mouse-type input device. To the user, the drag and drop action moves a piece of data from a source location, or context, to a target context. However, to the application, the locations themselves are contexts, and the drag and drop operation is typically represented by two command objects, one which operates on the source context to update it and remove a data object therefrom, and one that operates on the target context to update it with the dragged data object. To maintain the appearance of a single drag and drop action, these individual command objects must operate in synchrony on their respective contexts. Each context is independently updated, but to the user the appearance is of a unified action.

In most applications, it is desirable to provide a mechanism by which the user can perform an action, and undo that action if the result is dissatisfactory, or redo the action. Typically, the undo or redo actions are implemented as separate methods of a single command object that performs the action. In these instances, undoing and redoing the action is relatively straight forward and is provided in most conventional applications. Because there is only a single context as the target of the undo/redo, most such actions do not require synchronized commands, since the same target context is updated by each action.

However, where the original action affects two or more contexts, then an undo or redo of that action must restore the state of the both contexts. Because of the separate contexts, there needs to be a separate command object operating on each. Accordingly, because the user should perceive the undo or redo as a single action, the underlying command objects that execute the undo or redo must operate synchronously on their respective contexts. For example, in a word processor, a drag and drop operation of text data from one window to another results in two command objects, one to delete the text from the source window, and one to place the text in the target window. To undo the drag and drop action, the two command objects created to perform the drag and drop must execute their undo methods in synchrony.

One existing solution to synchronizing command objects in separate contexts is to identify a lowest common parent context that hierarchically contains the separate contexts. Typically between the parent context and the separate contexts there will be a number of intermediate contexts, each of which may have its own undoable command object. These undoable command objects are deleted, and an undoable command object is then posted in the parent context, allowing the operations in the separate contexts to be undone. The deletion of the command objects in the intermediate contexts is undesirable because these command objects are unrelated to the command objects in the separate contexts. Thus, the user loses the ability to undo these commands objects as an side effect of attempting to undo the command objects in the lower level separate contexts.

Accordingly, it is desirable to provide a method for synchronizing command objects that allows for unified execution and undoing of the commands on independent contexts.

SUMMARY OF THE INVENTION

The present invention overcomes the limitations of prior systems by linking individual command objects, each of which is responsible for its own methods for executing on data objects in the context it is associated with, and then synchronizing the execution and deletion of the linked command objects. When a synchronous user action is initiated, a command object is created in the context where the action originated, i.e., the source context, and a command object is created in the context where the action is targeted, i.e., the target context. The individual command objects are linked, so that one command object can be accessed and invoked in one context, when the other command object is invoked in an active context. This allows for synchronization of the execution of the command objects, so that both command objects are either done or undone at the same time. In this manner, the user will perceive the action as unified, even though it affects data objects in two contexts. The user can thus cause the do and undo method of one command object to be invoked, and the corresponding do or undo method of a linked command object will also be invoked.

In order to ensure that a command object can be undone only when another command object linked thereto is capable of being undone, the present invention provides for synchronizing the deletion of linked command objects. The command object may be deleted because it failed to execute properly, or because it was not undoable. When a command object is deleted, it is destroyed and can no longer be executed,.either to do or undo its affects on its data objects. Accordingly, when a command object is processed for execution, its delete state is determined and compared with the delete state of its linked command object. If these are different, it means that one command object has been deleted, and the other has not. Accordingly, the command object that has not been deleted is deleted. In this manner both of the command objects are either doable or undoable together, and if one has been deleted, and thus is undoable, the other is brought into synchrony. This way, the user is presented with a consistent ability to either undo or not undo both command objects to produce consistent results in the source and target contexts.

BRIEF DESCRIPTION OF THE DRAWINGS

FIG. 2 is a flowgraph of the method of linking command objects for synchronous operation.

FIGS. 3a–f are illustrations of the affect of a synchronous operation on the state of the software application.

FIG. 7 is a flowgraph of the process of synchronizing the delete states of linked command objects.

FIG. 9 is a flowgraph of the process of deleting a last command object in a context.

DETAILED DESCRIPTION OF THE INVENTION

System Architecture

Figure 1A:
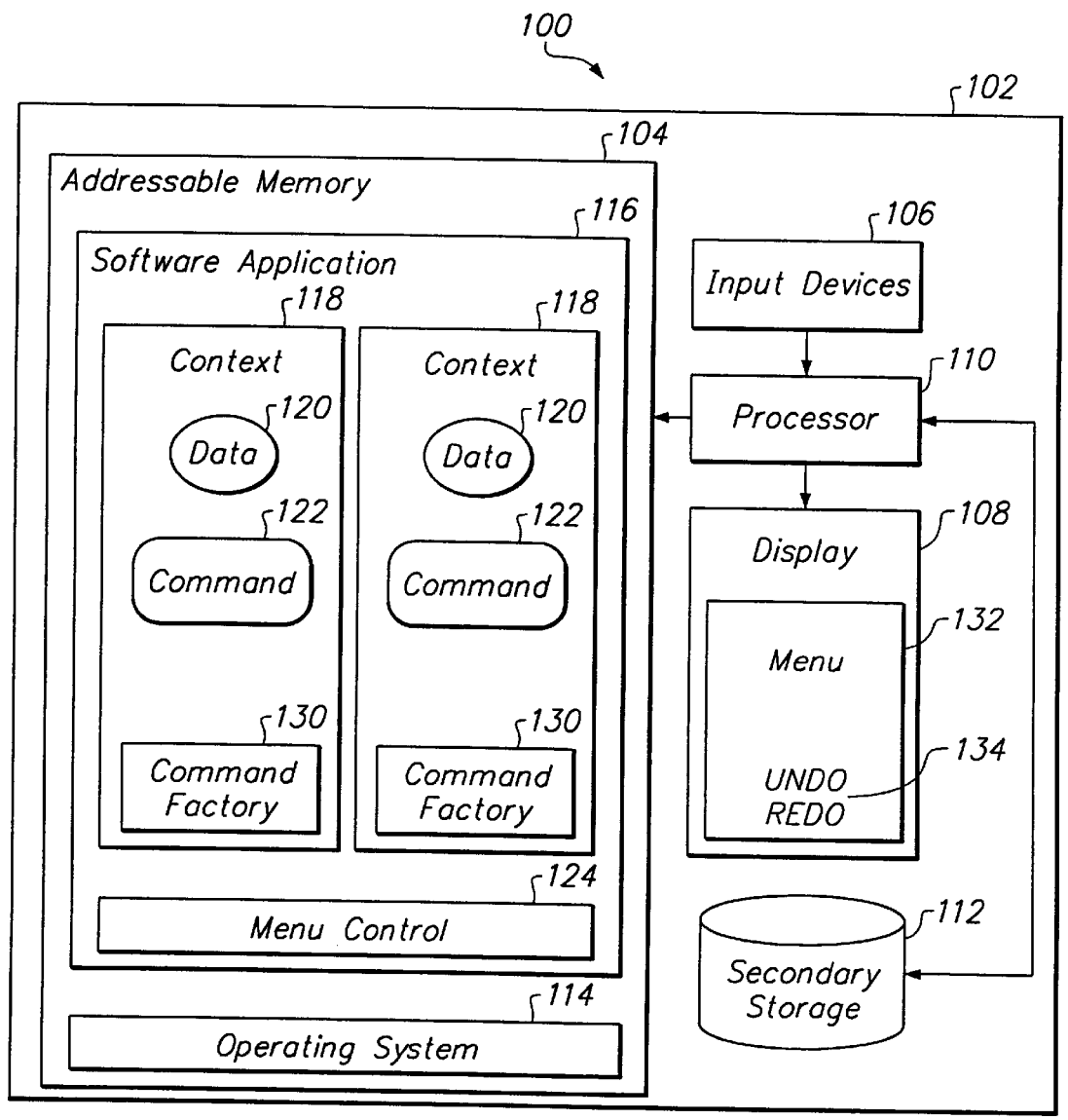
FIG. 1a is a block diagram of a system providing the synchronous command linking of the present invention.

Referring now to FIG. 1a, there is shown a block diagram of the system of the present invention. The system 100 includes a computer 102 having addressable memory 104, input 106 and output 108 devices, a processor 110, and a secondary storage device 112. The computer 102 may be a general purpose computer, such as an Apple Macintosh manufactured by Apple Computer Inc., of Cupertino, Calif. Any other general purpose computer may also be used in the invention. The input devices 106 operate in a conventional manner to receive user inputs, and include devices such as a keyboard, mouse, touchscreen, voice input, and the like. The output devices 108 represent to the user the operations and data managed by the system 100, such as through a display or printer. The secondary storage device 112 provides long term storage of user generated data and other information.

The addressable memory 104 includes a conventional operating system 114, such as Apple's Macintosh OS, and a software application 116. All of the functionality of the software application 116 described herein is executed by the processor 110 in conjunction with the operating system 114. The software application 116 is preferably written in an object oriented development environment, though non-object oriented development environments may also be used. The preferred development environment is Apple's MacApp, which provides an object oriented application framework from which the software application 116 can be derived. The development environment preferably provides a library of classes that provide the linked command objects of the present invention. Alternatively, the linked command objects may be created and used without reliance on a class library of a development environment. The software application 116 may be of any type, such as word processor, graphic program, spreadsheet, database, and the like. The software application 116 need only provide some amount of user selectable operations that manipulate selected data managed by the software application 116.

The software application 116 manages a number of contexts 118. In the illustration of FIG. 1a, there is shown only two contexts for ease of illustration, however in practice, the software application 116 may support many contexts 118 simultaneously. Each context 118 is an object that manages any number of data objects 120 and command objects 122, and presents one or more representations of the data objects 120 to the user. The contexts 118 may be hierarchically related, such as a document context containing window contexts, each containing field contexts. The data objects 120 that are managed by a context 118 are not necessarily stored in the context 118, but rather, the context 118 provides the user access to some representation of the data object 120. At any one time, only one context 118 is the active context 118, though the user may rapidly shift between contexts 118.

Contexts 118 may take many different forms. For example, a context 118 in a database application may be a data entry field in a particular layout that shows selected fields of the records in the database. Each such data entry field is its own context 118, and manages the data entered by the user in the field. Separate windows each showing a different layout of fields would also represent separate contexts 118, as would different windows presenting layouts from different database files. As another example, in a word processor, each document window would be a context. These are but a few of the various types of contexts 118 that can be supported by different instances of the software application 116.

The software application 116 further includes a menu control module 124. The menu control module 124 provides on a display type output device 108 a menu 132 of operations that may be affected by the user on the data objects 120 presented in a currently active context 118. Each operation is represented by a menu item 134. Each operation is executed by one or more linked command objects 122 associated with each context 118. In addition to menu items 134, operations may be initiated by the user through the other input devices 106, such as the mouse, keyboard, and the like.

The state of the menu 132, that is, which particular operations are available to the user, is dependent on which context 118 is active. For example, if a text window context 118 is active in a suitable software application 116, the menu 132 will reflect operations that may be performed on text data objects 120 in the context 118, and will display the appropriate menu items 134. If the user switches to a page layout context 118 showing a representation of the text data 120 as printed, then other appropriate menu items 134 will be displayed. The operations available to a user may be any type of data transformation or usage, such as printing a text document, copying and pasting selected data, changing selected attributes of data objects 120, such as the font, font size, color, and the like of a text object, or the size, shape, texture, and the like of a graphics object, or similar data manipulations commonly found in software applications.

The software application 116, either through the menu control module 124 or through an input device 106 such as a mouse, enables the selection of synchronous operations. Synchronous operations are those directed at two data objects in the same or different context, and which appear to the user as single unified operation. An exemplary synchronous operation is a drag and drop operation performed with a mouse or similar input device 106. The behavior of a drag and drop operation is further described below with respect to FIGS. 3a–f.

In the preferred embodiment, a command factory 130 in each context 118 is used to generate a command object 122 at about the time an operation is initiated by a user, either from the menu 134, via a mouse or from another input device 106 such as a keyboard. The command factory 130 is passed an object type for the command object 122 and a reference to the data object 120 being operated on, and invokes the corresponding constructor function for the command object type being created.

Each command object 122 provides methods and attributes that implement and execute the operation it represents. More particularly, each command object 122 includes a Do( ) method that performs some portion of the substantive functionality of the operation on a target data object 120; an Undo( ) method that restores the data object to its previous state; a Redo( ) method that affectively undoes the results of the Undo( ), restoring the state of the object to that created by the Do( ) method; and a Delete( ) method that destroys the command object 122 via its destructor function. Once deleted, the command object 122 cannot be undone. These methods are invoked, either directly, or indirectly, by the context 118 that manages the command object 122 in response to the appropriate user operations. It is understood that the method names used here are only illustrative of the underlying functionality of the method, and that other method names could be substituted.

Figure 1C:
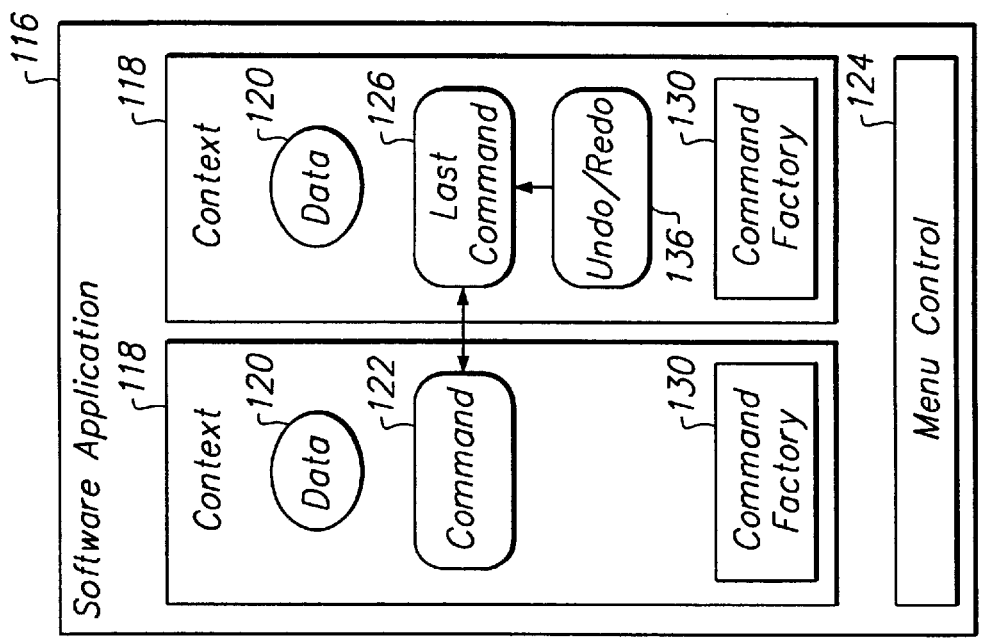
FIGS. 1b and 1c are block diagrams of the software application of the present invention illustrating various aspects of the operation of contexts.
Figure 1B:
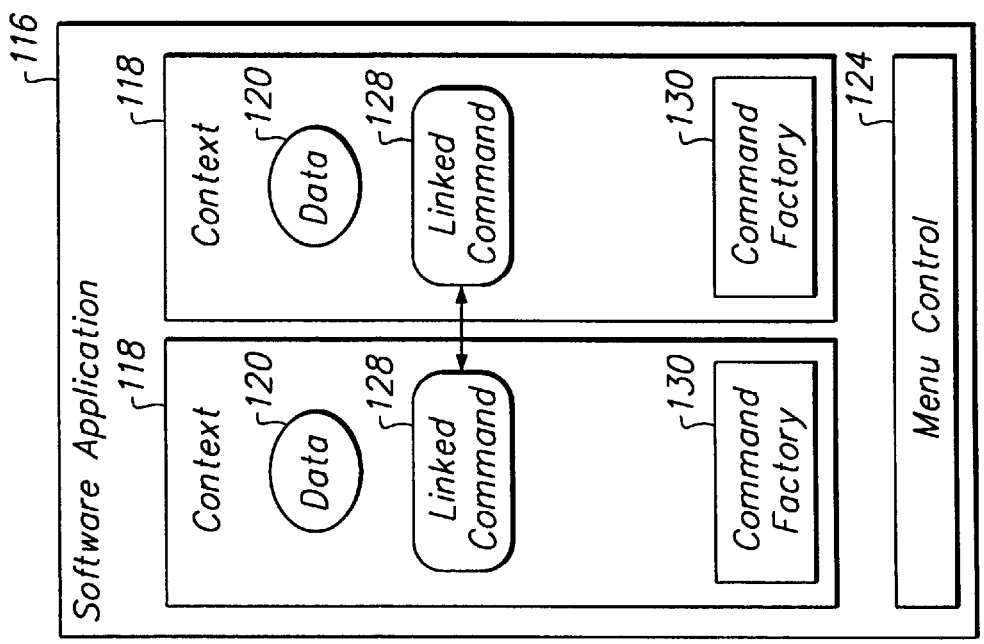

A command object 122 further includes particular attributes used to establish and maintain links to another command object 122, thereby establishing the linked command objects of the present invention. A linked command attribute provides a one way association to another command object 122. When a command object 122 is linked by its linked command attribute to another command object 122, both command objects 122 become linked command objects 128. FIG. 1b illustrates a pair of linked command objects 128. In the preferred embodiment, the linked command attribute is a pointer to a command object type. When first command object 122 is linked with second command object 122, the linked command attribute of each command object 122 is set to point to the other command object 122. This allows the context 118 that manages the first linked command object 128 to access the second linked command object 128 and invoke it, if necessary, to maintain a synchrony with the first linked command object 128. This process is more fully described below. Other linking techniques may be similarly employed, so long as one linked command object 128 may be accessed and invoked from another linked command object 128, either directly, or indirectly. In alternate embodiment, the linked command objects 128 may be either singly or doubly linked. References herein to a "command object 122" also apply to linked command objects 128, as the latter are always a subgroup of the former, and references to a "linked command object 128" will be used where necessary to describe the specific behavior or attributes of a linked command object 128 apart from unlinked command objects 122.

Each command object 122 further preferably includes a command done attribute, which is a Boolean variable indicating the current state of the command object, whether "done" or "undone." A command done attribute is TRUE or "done" when the Do( ) method of command object 122 has been executed, and the data object 120 that is manipulated by the command object 122 has been altered to a different state. The command done attribute is FALSE or "undone" when the data object 120 is restored to the state is held prior to execution of the Do( ) method.

In the preferred embodiment, each command object 122 further includes a validation attribute that indicates whether either the command object 122 or any linked command object 128 linked thereto has failed a conventional validation test performed when either one of the command objects 122 is executed. Such a validation test is used here to improve execution synchrony between linked command objects 128, and to prevent one linked command object 128 from being done or undone when the operation cannot be performed by its corresponding linked command object 128.

Each command object 122 is associated with the context 118 that includes the command factory 130 that produced the command object 122. This allows each context 118 to manage the command objects 122 that operate on data objects 120 also managed by the context 118. Each context 118 maintains the identity of a last command object 126 that was executed within the context 118. This is illustrated in FIG. 1c. In the preferred embodiment, a context 118 maintains only one last command object 126, but multiple last command objects 126 may also be maintained. At some times there may be no last command object 126 in a given context 118. Also, the last command object 126 may be a linked command object 122 in the same or another context 118. Each command object 122 includes an owner context attribute identifies, or points to, the context 118 to which the command object 122 belongs.

Referring again to FIG. 1a, in the preferred embodiment, the menu control module 124 provides menu items 134 corresponding to an undo operation, and a redo operation. The undo operation restores a data object 120 that is the target of a selected operation to the state it held prior to the execution of the selected operation. The undo operation is available to the user only after a selected operation has been executed by the Do( ) of the command object 122 that performs the operation. The redo operation is available to the user only after an undo operation has been affected by the Undo( ) method of the command object 122. The redo operation restores the state of the target data object 120 to that created by the selected operation by causing the invocation of the Redo( ) method of the command object 122. The undo and redo operations are applied to the last command object 126 maintained in the context 118. Accordingly, as the user switches contexts 118, the menu 134 is updated to reflect whether an undo or redo operation is available, based on whether there is a last command object 126 associated with the active context.

In the preferred embodiment, undoing and redoing a command object 122 is managed by an undo/redo object 136. The undo/redo object 136 is a special type of command object that exists only to manage the execution of the Undo( ) and Redo( ) methods of a last command object 126 in the active context 118. FIG. 1c illustrates an undo/redo object 136. When created by the command factory 130 of the active context 118, the undo/redo object 136 determines the last command object 126 and either invokes its Undo( ) method if the command done attribute is TRUE, otherwise it invokes the Redo( ) method. This process is more fully described below with respect to FIG. 8.

System Operation

Referring now to FIG. 2, there is shown a flowgraph of the overall process of creating and using linked command objects. The overall process includes creating 202 the command objects and linking them, executing 204 the command objects in synchrony including undoing and redoing, and synchronizing 209 the delete states of the command objects 122. These various operations are preferably managed by the contexts 118 themselves. However, in alternate embodiments, other elements of the software application 116 may manage these processes.

Creating 202 the command objects 122 is generally done as follows: A command object 122 is initially created 201 in response to a user selected menu item 134, or other operation in a currently active context 118. As stated, the available menu items 134 and operations are based on the currently active context 118 and the selected data objects 120 therein. Where an operation affects data objects 120 in two contexts 118, that is, an active context 118, and an inactive context 118, then a command object 122 is also created 203 in the inactive context 118. Alternatively, two command objects 122 may be created in a same context 118. In either case, where there are two command objects 122, each command object 122 is linked to the other, resulting in a first and second linked command object 128.

Referring also to the flowgraph of FIG. 2, executing 204 the linked command objects 128 is generally done as follows: A first linked command object 128 in the active context 118 is executed 205, the execution managed by the active context 118. The execution will do the user selected operation on the selected data object(s) 120 in the active context 118, resulting in the invocation of the Do( ) method of the linked command object 128. A second linked command object 128 is then executed 207, similarly, again performing its Do( ) method. Each linked command object 128 performs its function in its context 118. On subsequent asses through execution 204, the Undo( ) and Redo( ) methods of the command objects 122 will be invoked, as necessary, to undo or redo the state of the data object 120.

The linked command objects 128 are then synchronized 209 as to their delete states. When a command object 122 is deleted, it is discarded from its context 118, and it cannot be undone by its Undo( ) method. This commits the data object 120 to the state it is in at the time the command object 122 is deleted. Accordingly, because the linked command objects 128 must be done and undone in synchrony, if a first linked command object 128 has been destroyed and cannot be undone, then the second linked command object 128 also cannot be undone. Thus, when the first linked command object 128 is deleted, and hence cannot be undone, then the second linked command object 128 must also be deleted.

Once the delete states of the command objects 122 are synchronized, if both command objects 122 have been deleted, then the process exits. Otherwise, the command objects 122 are available for undoing and redoing, and the process loops back to executing an undo/redo object 136 in the active context 118.

Figures 3C, 3D:
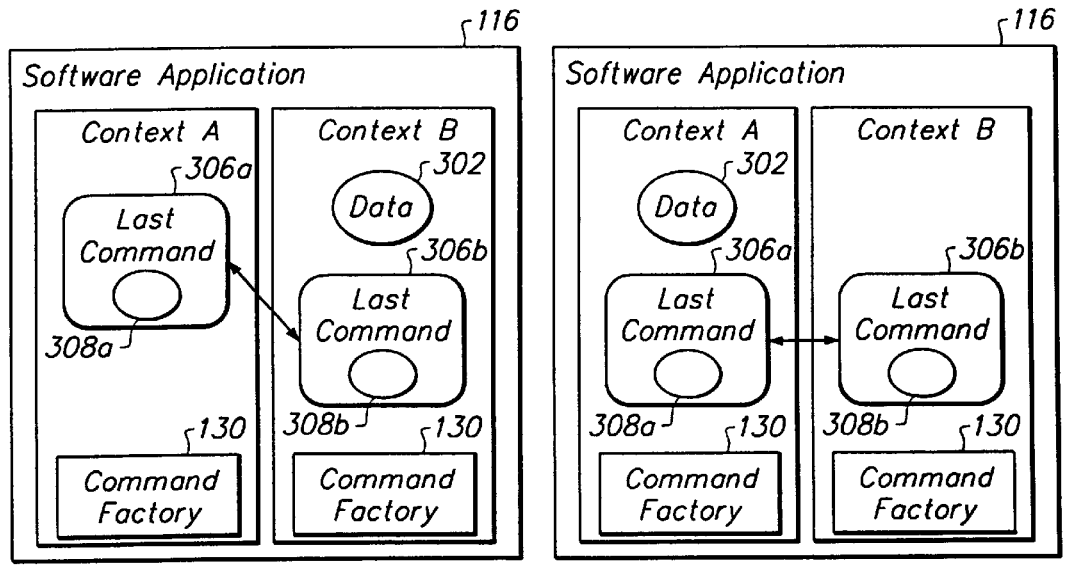

For example, in FIGS. 3a–f, there is shown the logic of a drag and drop operation between two contexts 118, context A and context B, where context A is the active context, and context B is inactive. In FIG. 3a, a data object 302 exists in context A. In FIG. 3b, the data object 302 is selected and dragged to context B. The command factory 130 in context A creates a command object 304a to handle the deletion of the data object 302 from context A, and the command factory 130 in context B creates a command object 304b to handle the placement of the data object 302 in context B. These command objects 304 are linked, making them linked command objects 128. From the perspective of context A, context B is its "linked context." Correspondingly, from the perspective of context B, context A is its linked context.

In FIG. 3c, the command object 304a in context A has been executed, and now is the last command object 306a of the context, and the data object 302 has been deleted. The last command object 306a saves the state 308a of the data object 302 in context A in case the state is to be restored by an undo operation. Likewise, the command object 304b in context B has been executed, and it becomes the last command object 306b in the context. The data object 302 is placed in context B, and the state 308b of the data object 302 is saved in the last command object 306b. Note that the command objects 122 remain linked as the last command objects 306 of their respective contexts.

At this point, the drag and drop may be undone by the user by making either context A or context B active, and initiating an undo operation by selecting the appropriate menu item, keyboard input, or the like. In FIG. 3d, the user has initiated an undo, and the data object 302 is restored in context A and removed from context B. The last command object 306a is thus undone, and the saved state 308a reflects the done state of the drag, that is the removal of the data object 302 from context A. Likewise, the last command object 306b is undone and saves the state of the data object 302 having been added to context B.

Figures 3E, 3F:
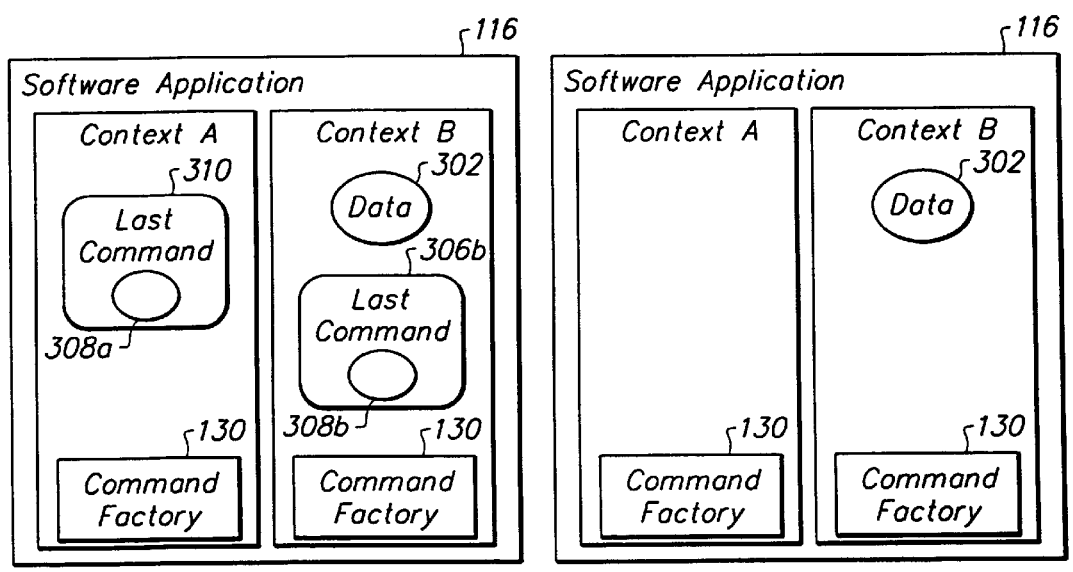

The user may redo the original drag and drop (by undoing the undo operation), restoring the state shown in FIG. 3c. However, if from the state of FIG. 3d, the user made context A active and performed other operations resulting in the creation and execution of additional command objects 122, then the last command object 306a would be deleted, and replaced by last command object 310. This state is shown in FIG. 3e. At this point, the last command object 306b in context B cannot be undone because the last command object 306a it was associated with has been deleted. Accordingly, the delete states of the linked last command objects 306 are synchronized, and the last command object 306b is deleted, as shown in FIG. 3f, leaving the data object 302 in context B.

Figure 4:
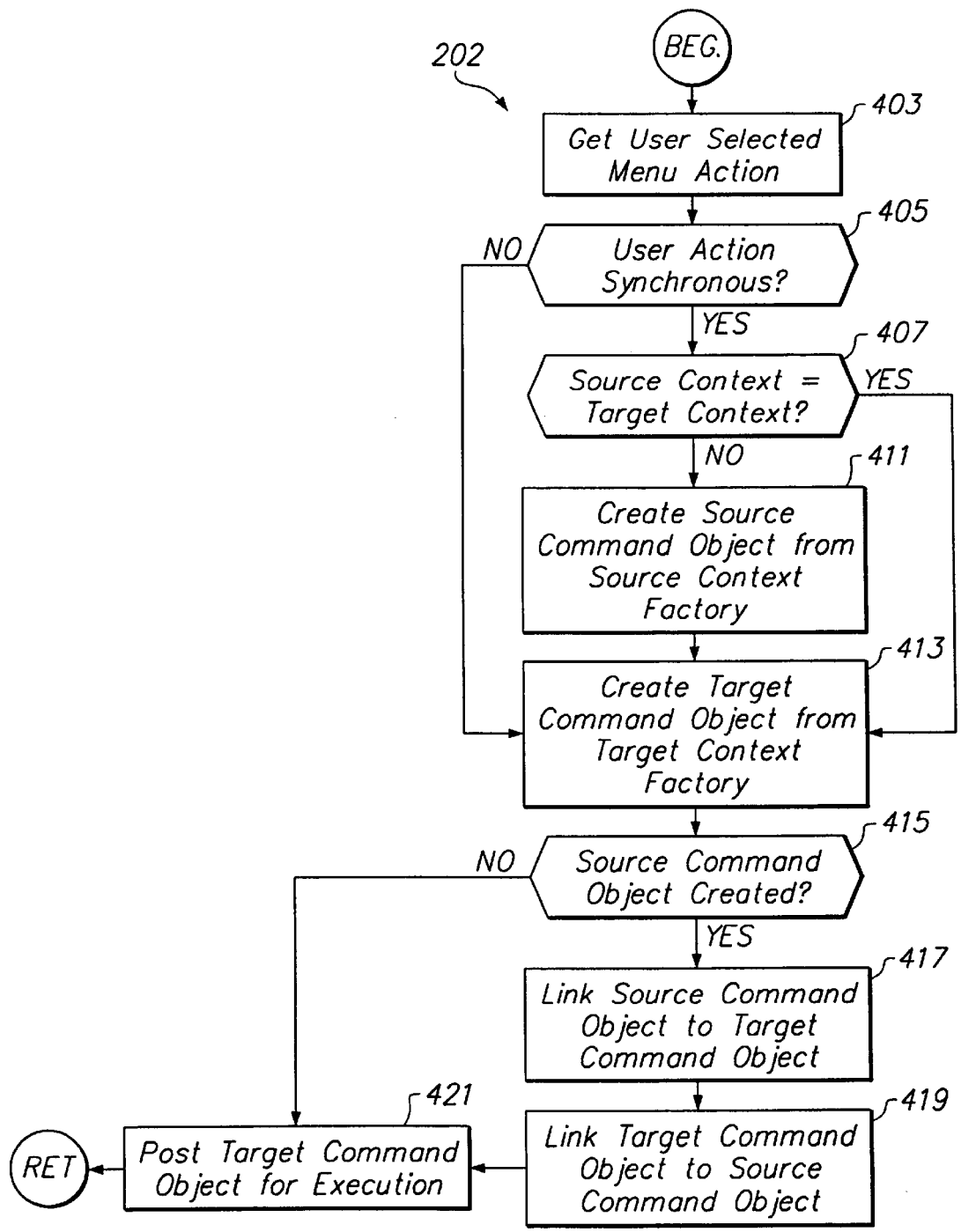
FIG. 4 is a flowgraph of the process of creating and linking command objects.

Referring now to FIG. 4, there is shown a more detailed flowgraph of the preferred method of creating 202 linked command objects 128. The method is executed by the active context 118 in which the user selects an operation to perform. The user-selected operation is obtained 403, either from selection of a menu item 134, or by a keyboard input, or the like.

The user operation, is then tested 405 to determine whether it is a synchronous operation, such as a drag and drop operation. If so, then two command objects 120 need to be created, one in each of the contexts 118, affected by the operation. However, it may be that the contexts 118 of the operation are the same, rather than different. Generally, a source command object 122 will be associated with the active context 118, that is the context 118 in which the operation is initiated, and a target command object 122 will be associated with an inactive context 118 which is affected by the operation. For example, with a drag and drop operation, the source context 118 is where the data object 120 being dragged resides, and the target context 118 is the context to which the data object 120 will be dragged.

Accordingly, where the operation is synchronous, the source context 118 is compared 407 with the target context 118. If they are the same, then there is only one context 118 for the operation, and a target command object 122 is created 413 from the command factory 130 in the target context 118, which is the active context 118. In the preferred embodiment, this is done by assigning to the initialized target command object 122 the result of an invocation on the command factory 130 specifying the desired command object 122 for performing the operation and the data object 120 to be affected. The command factory 130 will produce a target command object 122 with a method to implement the operation, and with access to the data object 120 being manipulated. If the source context 118 is different than the target context 118, then a source command object 122 is created 411 from the command factory 130 in the source context 118, and then a target command object 122 is created 413 by the command factory 130 of the target context 118, which will be a different context 118 from the active context.

If the user selected operation is not synchronous, then there is no need to create more than one command object. In this instance, only a target command object is created 413 from the target command factory 130. For example, with a copy and paste operation, the paste affects only a target context 118, and generally has no affect on the source context 118 of the copied data object 120.

As a result of the foregoing, there will be at least a target command object 120. The active context 118 then tests 415 whether source command object 122 was created, that is whether it was re-assigned from its initialized state. If so, then there are two command objects 122 that must act in synchrony. Accordingly, the source command object 122 is linked 417 to the target command object 122, and the target command object 122 is linked 419 to the source command object 122. The links are preferably established by setting the linked command attributes of each command object 122 to point to the other command object. The source and target command objects are now linked command objects 128.

After the command objects 128 are linked, or when there is only a target command object 122, the target command object is posted 421 for execution. Posting makes the command object 122 available for execution by the context 118 managing the command object 122. Posting may involve placing the target command object 122 in a suitable stack, queue, or other prioritizing structure that the context 118 accesses to determine which command object 122 to execute at any given time.

Figure 5:
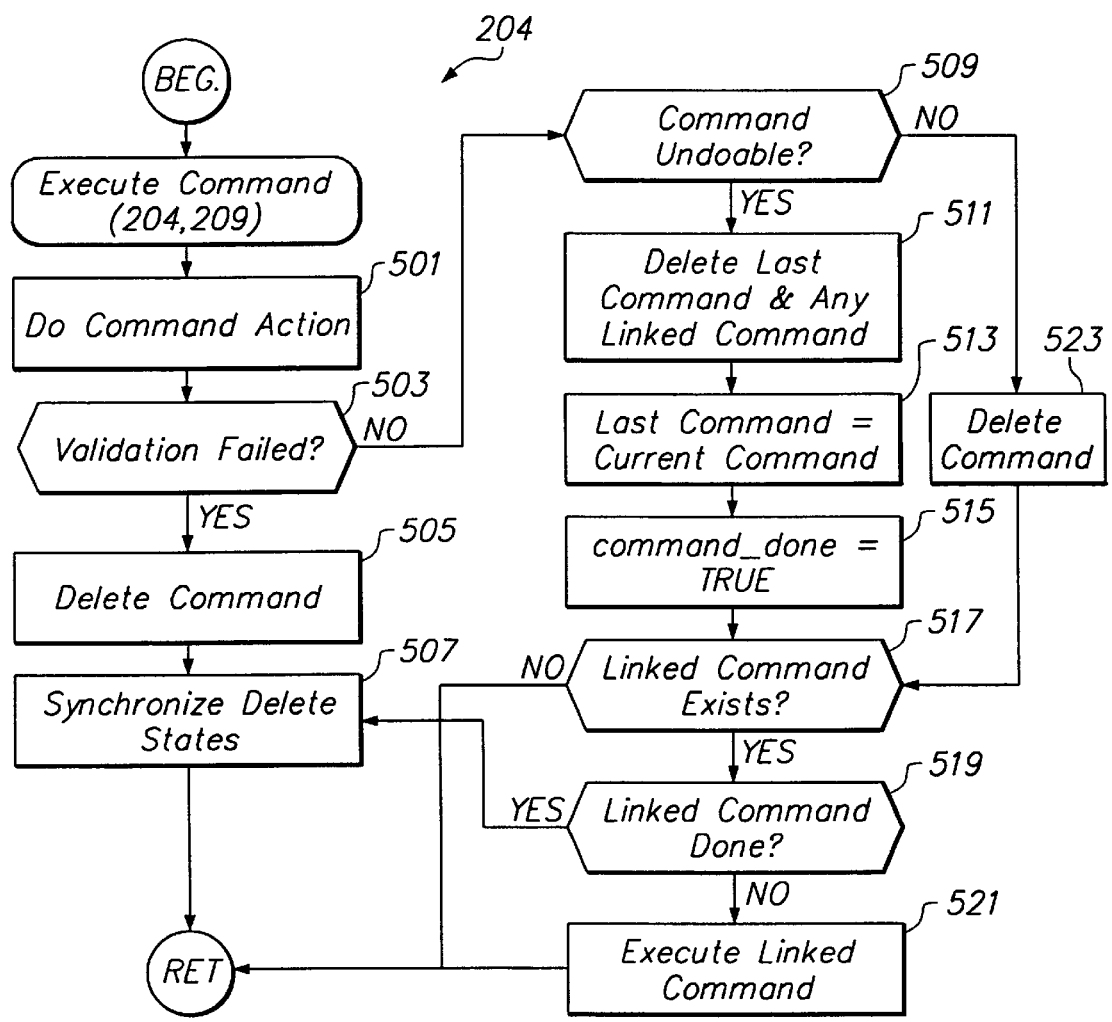
FIG. 5 is a flowgraph of the process executing linked command objects.

Referring now to FIG. 5, there is shown a flowgraph of the process 204, 209 of executing a command object 122 and synchronizing the delete states of the command objects 122, including linked command objects 128. This process is a high level execution management process that relies on lower level processes, such as the Do( ) method to actually execute a command object 122. The process is a method of each context 118. It is initially executed by the context 118 that is active. It is assumed that the context 118 has already determined which command object 122 to execute where there is more than one command object 122 available for execution.

Figure 6A:
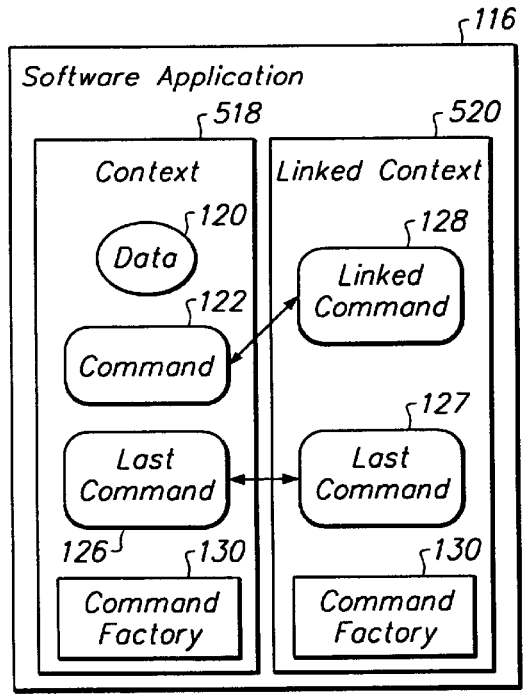
FIGS. 6a–d are illustrations of the execution process on the state of the software application.

The explanation of FIG. 5 is to be understood from the perspective of the active context 518 in FIGS. 6a–d. In FIG. 6a the active context 518 contains the command object 122 being executed, and a last command object 126 from the execution of a previous command object 122. The linked context 520 contains the linked command object 128 associated with the command object 122, and a last command object 127 linked to the last command object 126 in the active context 518. In the description of FIG. 5, the command objects 122 are not referred to as source and target objects, since which command object 122 is executed depends only on the currently active context 518, not on which context 118 was active when the command object 122 were created. Rather, where there are linked command objects 128, a command object 122 is associated with the currently active context 518, and a linked command object 128 is associated, with a second, different context, here the linked context 520. In alternate embodiments, the linked context 520 may be the same as the active context 518.

Referring now to FIG. 5 and FIG. 6a, the active context 518 invokes 501 the Do( ) method of the current command object 122. The Do( ) method will perform the functionality of the user selected operation. As a result of the Do( ) method the validation attribute of the command object 122 will be updated to indicate whether execution of the command object 122 was successful.

The active context 518 will then test 503 whether validation failed. If validation of the command object 122 failed, the operation performed by the command object 122 cannot be undone since it was never completed. Accordingly, there is no need to make it the last command object 126 of the active context 518 so it can be undone, or to execute the linked command object 128. In this case, the active context 518 deletes 505 the command object 122, invoking its Delete( ) method. The Delete( ) method is atomic and calls the destructor function of the command object 122. The active context 518 then synchronizes 507 the delete states of the command object 122 and any linked command object 128 associated with it.

Figure 6B:
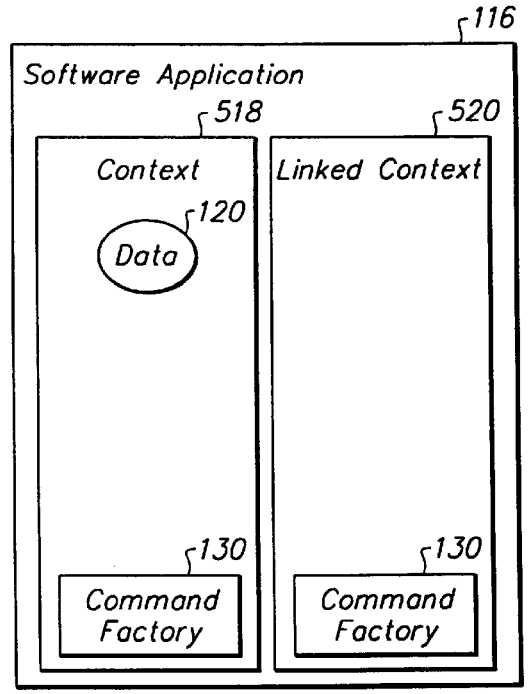

The synchronize delete states process is further described below with respect to FIG. 7. Briefly, this process will identify and delete a linked command object 128 so that both the command object 122 and its linked command object 128 are deleted. In this manner the linked command object 128 cannot be executed, which is the desired result since the command object 122 failed to execute. The result of this process is shown in FIG. 6b.

If validation did not fail, then the active context 518 determines 509 whether the command object 122 is undoable. The software application 116 maintains data indicating which operations and their corresponding command objects 122 can be undone. If the command object 122 is not undoable, then it is deleted 523 by calling its Delete( ) method.

If the command object 122 can be undone, then the active context 511 deletes the last command object 126 and any linked command object 127. Deleting the last command object 126 prevents it from being undone, and so any linked command object 127 must likewise be deleted and prevented from being undone. The process of deleting the last command object 126 is illustrated in FIG. 9.

Referring now to FIG. 9, the active context 518 determines 901 whether there is a linked command object 128 for the current command object 122. If so, then the linked command object 128 is deleted 903. The active context 518 then deletes the command object 122. This process commits the command object 122 and the linked command object 128 as a pair, and thus results in the states of the data object(s) 120 being synchronized. In this fashion the data object(s) 120 in both the active context 518 and the linked context 520 are prevented from being individually undone.

Figure 6C:
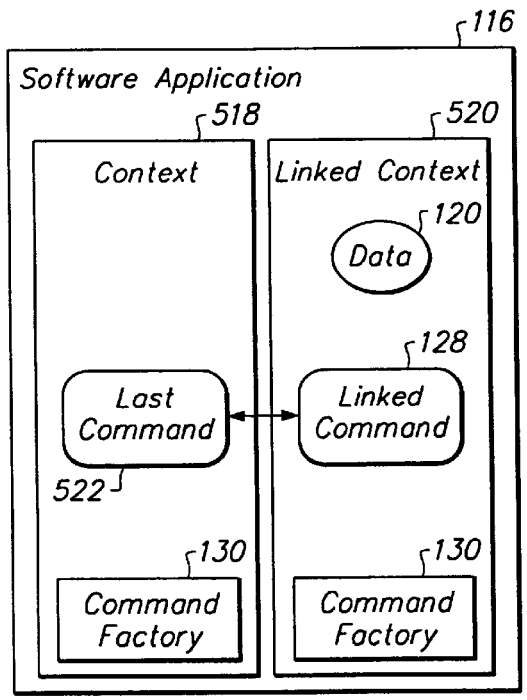

Referring again to FIG. 5, the active context 518 assigns 513 the current command object 122 as its last command object 522. As the last command object 522 of the active context 518 it remains linked to the linked command object 128. This state is shown in FIG. 6c.

The command done attribute of the last command object 126 is then set 515 to TRUE indicating that it is in a done state. As noted above, the last command object 522 will save the previous state of the data object 120; the saved state is not shown in the figure.

The active context 518 then tests 517 whether there is a linked command object 128 for the last command object 522. If not, then the active context 518 exits and returns control to the software application 116. This allows the last command object 522 to be undone and redone by the undo/redo object 136 should the user so desire. The next time another command object 122 is called for execution 204 in this active context 518, the current last command object 522 will be deleted 511, and then cannot be undone.

If there is a linked command object 128, then the active context 518 tests 519 whether that linked command object 128 has been done, preferably by testing the command done attribute of the linked command object 128. If the linked command object 128 has been done, then it is already in synchrony with the last command object 522 in the active context 518. The active context 518 then synchronizes 507 the delete states of the last command object 522 and the linked command object 128. Again, this deletes one command object 122 where its linked command object 128 has been deleted.

Figure 6D:
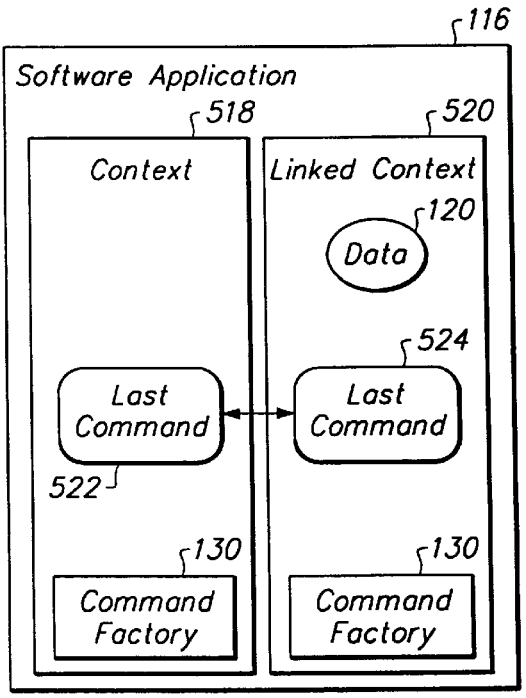

However, if the linked command object 128 in the linked context 520 has not been done, then the last command object 522 in the active context 518 and the linked command object 128 in the linked context 520 are not is synchronized in their operative states. Accordingly, the active context 518 recursively calls 521 the execute command process on the linked command object 128. This is preferably done by traversing to the owner context attribute of the linked command object 128 via the linked command attribute of the last command object 522. This execution process will make 511 the linked command object 128 the last command object 524 of the linked context 520. This state is shown in FIG. 6d.

When the execute command returns to the active context 518, the active context 518 then returns control to the software application 116.

Referring now to FIG. 7, there is shown in further detail one embodiment of process of synchronizing 507 the delete states of two command objects 122. The synchronization process is preferably performed by the active context 518. The active context 518 begins by determining 701 whether there is a linked command object 128 for the current command object 122 being executed. If not, then there is nothing to be synchronized. Otherwise, the active context 518 determines 703 whether the command object 122 and linked command object 128 have the same delete states, that is whether one has been deleted and the other not. If they do, then either both or neither command object 122 has been deleted. This condition will occur where the command object 122 successfully executes (503), is undoable (509), and the linked command object 128 is done (519). If this condition is the case, then the active context 518 exits and returns to the process of executing the command object 122.

The delete states will differ either where the command object 122 failed to execute properly and was deleted (505), or where it executed properly but was not undoable and thus deleted (523), or where the linked command object 128 failed to execute properly in its linked context 520, and thus was deleted. If this is the case, then the active context 518 will determine 705 which command object was deleted. If the command object 122 in the active context 518 was deleted, then the active context 518 will call 707 for the deletion of the linked command object 128 in the linked context 520. Otherwise, it will delete 709 the command object 122. This process ensures that either both command objects are extant and undoable, or they are both deleted.

Figure 8:
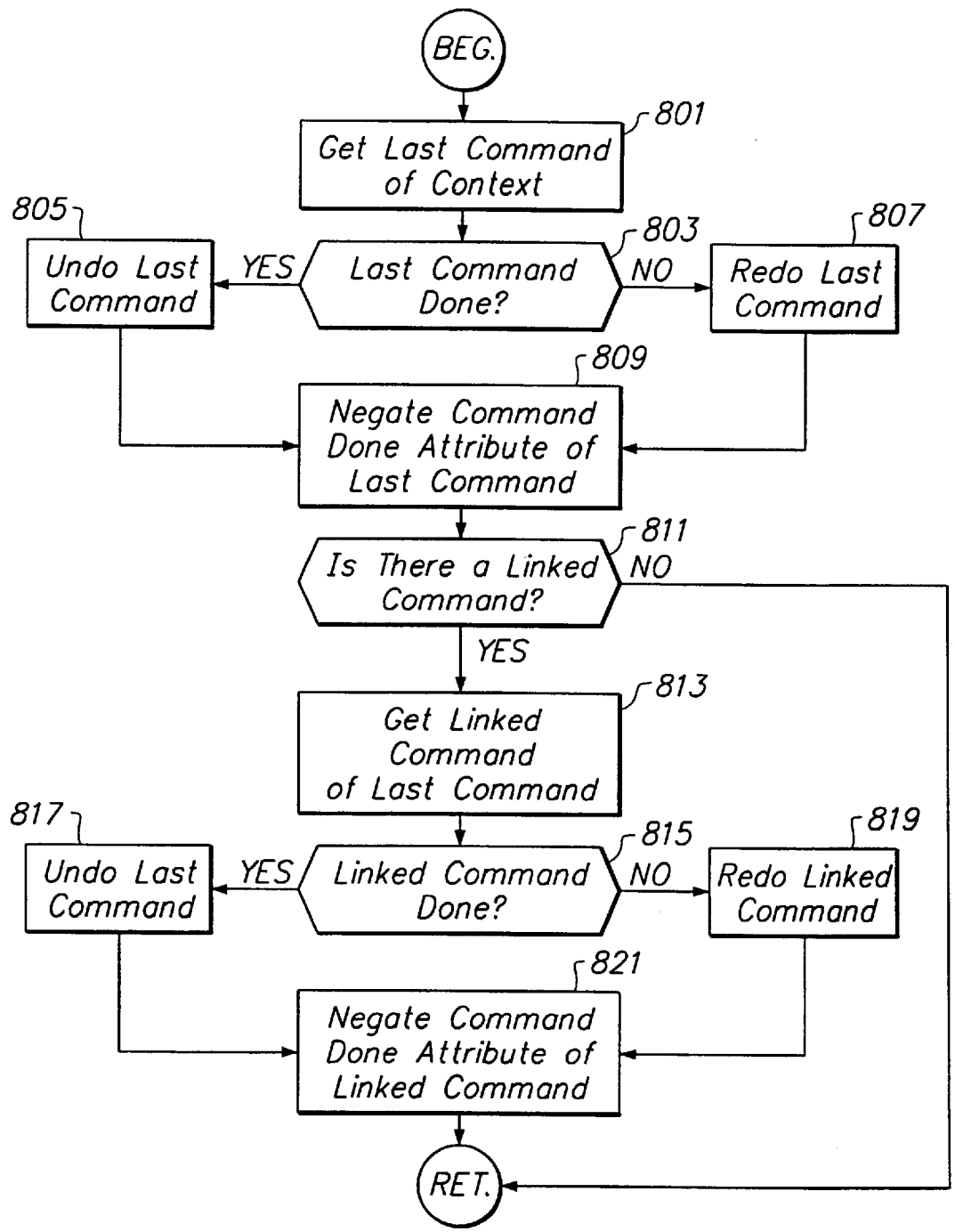
FIG. 8 is a flowgraph of the process of undoing and redoing linked command objects.

Referring now to FIG. 8, there is shown a flowgraph of the process of undoing and redoing an operation executed by a command object 122. In the preferred embodiment, the process is implemented as a method of the undo/redo object 136. This method is invoked on the undo/redo object 136 during the process 204 of executing the command objects 122 where the command object 122 has not been deleted.

Referring now to FIG. 1c, each context 118 includes a last command object 126 which is updated to the undoable command object 122 that most recently executed successfully in the context 118. When the undo operation is selected by the user, for example, from the menu 132, the Undo( ) or Redo( ) method of the last command object 126 will be invoked, as appropriate to restore the state of the manipulated data object 120 to the state desired by the user. The determination of which method to invoke, Undo( ) or Redo( ), is handled by the undo/redo object 136. The undo/redo object 136 is invoked by the active context 118 where the user has selected an undo or redo operation. Unlike command objects 122, the undo/redo object 136 does not persist as the last command object 126 of the active context 118 after it has completed its method.

Referring again to FIG. 8, the undo/redo object 136 obtains 801 the last command object 126 of the active context 118. This is preferably done by traversing last command attribute of the active context 118. The undo/redo object 136 then tests 803 whether the last command object 126 has been done, preferably testing the command done attribute of the last command object 126. If this attribute is TRUE, it means that the user has requested that the operation for the last command object 126 be "undone." Accordingly, the undo/redo object 136 undoes 805 the last command object 126, preferably invoking the Undo( ) method of the last command object 126. This will restore the data object 120 to the save state maintained by the last command object 126.

Otherwise, if the last command object 126 is already undone, then the user has requested that the operation associated therewith be "redone." The undo/redo object 136 then re-does the last command object 126, preferably invoking the Redo( ) method of the the last command object 126. These tests will result in either undoing or redoing the last command object. The undo/redo object 1236 then negates 809 the command done attribute of the last command object 126. This allows the last command object 126 to be either redone or undone again, should the user so desire.

The undo/redo object 136 then tests 811 whether there is a linked command object 128 to the last command object 126. This is done by checking the link command attribute of the last command object 126. If there is no linked command object 128, then the undo/redo object 136 exits, and is destroyed. Should the user desire to undo or redo the operation again, a new undo/redo object 136 would be created and would perform this method.

If there is a linked command object, the undo/redo object 136 obtains 813 the linked command object 128, and then determines 815 whether the linked command object 128 has been executed or "done." This is preferably done by checking the command done attribute of the linked command object 128. If the command done attribute is TRUE, then it means that the user has requested that the operation for the linked command object 128 be "undone." Accordingly, the undo/redo object 136 undoes 817 the linked command object 128.

Otherwise, if the linked command object 128 is already undone, then the user has requested that the operation associated therewith be "redone." The undo/redo object 136 then re-does 819 the linked command object 128. These tests will result in either undoing or redoing the linked command object 128, and bringing its execution state in synchrony with the last command object 126. Thus, the last command object 126 and the linked command object 128 will always be in the same state of either done or undone. This presents the user with a unified presentation and state of the selected operation, even where it affects multiple contexts.

The undo/redo object 136 then negates 821 the current value of the command done attribute of the linked command object 128. This updates the attribute to reflect whether the operation of the linked command object 128 is done or undone, depending on its prior state. At this point, the done/undone state of the last command object 126 and the linked command object 128 will be synchronized. The Undo/redo object 136 then exits, and is destroyed.

The undoing and redoing of the last command object 126 or any command object 122 has been described as manipulating the Undo( ) and Redo( ) methods of such objects. It is understood by those of skill in the art that other mechanisms may be similarly employed to restore the state of data objects 120 affected by a command object 122 to achieve the same result as an Undo( ) or Redo( ) method of a command object 122. For example, the functionality of such methods can be made a part of the context 118 managing the command objects 122.

We claim:

1. A system for linking the behavior of two command objects to provide synchronous operation thereof within multiple contexts of a single application, each context comprising a mechanism for representing data to a user, the system comprising:

first command object creation means for creating a first command object for performing a first operation in a first context;

second command object creation means for creating a second command object for performing a different second operation in a second context;

linking means, coupled to the first and second command object creation means, for linking the first an d second command objects such that each command object may be accessed and invoked by its linked command object;

execution synchronization means, coupled to the linking means, for synchronizing execution of the first and second command objects to provide unified execution and undoing of the first and second operations such that each command object is executed responsive to its linked command object being executed; and deletion synchronization means, coupled to the linking means, for synchronizing deletion of the first and second command objects such that each command object is deleted responsive to its linked command object being deleted.

2. The system of claim 1, wherein the execution synchronization means comprises:

means for executing the first command object in the first context;

means for accessing the second command object by its link to the first command object; and means for executing the second command object in the second context.

3. The system of claim 2, wherein the execution synchronization means further comprises:

means for accessing the first command object by its link to the second command object; and means for executing the first command object in the first context.

4. The system of claim 2, wherein each command object is associated with a context, each context having a last command object, and wherein each command object is in either a deleted state or undeleted state, the system further comprising:

last command object access means, for accessing a last command object of the context associated with the first command object;

linked command object access means, for accessing a command object linked to the last command object;

last command object deletion means, coupled to the last command object access means, for deleting the last command object; and linked command object deletion means, coupled to the linked command object access means, for deleting the linked command object.

5. The system of claim 1, wherein the first command object comprises a link attribute pointing to the second command object, and the second command object comprises a link attribute pointing to the first command object.

6. The system of claim 1, wherein each context is associated with a last command object indicative of a last command object invoked in the context, and wherein each command object is in either a done state or an undone state, the execution synchronization means further comprising:

determining means, for determining the last command object of the first context;

first execution means, coupled to the determining means, for, responsive to the state of the last command object, executing the last command object to achieve an opposite state;

access means, for accessing from the last command object a second command object linked thereto; and, second execution means, coupled to the access means, for, responsive to the state of the second command object, executing the second command object to achieve an opposite state.

7. The system of claim 1, wherein each command object is in either a deleted state or undeleted state, and wherein the deletion synchronization means further comprises:

comparison means, for comparing the state of the first command object to the state of the second command object;

selecting means, coupled to the comparison means, for, responsive to the states of the first and second command objects not being the same, selecting the command object being in an undeleted state; and, deleting means, coupled to the selecting means, for deleting the selected command object.

8. The system of claim 1, wherein the first command object is created in an active context, and the second command object is created in an inactive context.

9. The system of claim 1, wherein there are provided data objects, each data object associated with context, and wherein the command object creation means further comprise:

means for obtaining a user operation having a source context and a target context;

means for, responsive to the user operation being synchronous, determining whether the source context is the same as the target context;

means for, responsive to the user operation being synchronous and responsive to the source context not being the same as the target context, creating a first command object in the source context; and, means for, responsive to the user operation being synchronous, creating a command object in the target context, wherein the command object is the second command object if the source context is not the same as the target context.

10. The system of claim 1, wherein the first command object performs a drag operation, and the second command object performs a drop operation.

11. A system for linking the behavior of two command objects to provide synchronous operation thereof within multiple contexts of a single application, each context comprising a mechanism for representing data to a user, the system comprising:

a first command object generator, for creating a first command object for performing a first operation in a first context;

a second command object generator, for creating a second command object for performing a different second operation in a second context;

a linker, coupled to the first and second command object generators, for linking the first and second command objects such that each command object may be accessed and invoked by its linked command object;

an execution synchronization module, coupled to the linker, for synchronizing execution of the first and second command objects to provide unified execution and undoing of the first and second operations such that each command object is executed responsive to its linked command object being executed; and a deletion synchronization module, coupled to the linker, for synchronizing deletion of the first and second command objects such that each command object is deleted responsive to its linked command object being deleted.

12. The system of claim 11, wherein the execution synchronization module comprises:

a first execution module, for executing the first command object in the first context;

an access module, for accessing the second command object by its link to the first command object; and a second execution module, for executing the second command object in the second context.

13. The system of claim 12, wherein the execution synchronization module further comprises:

a second access module, for accessing the first command object by its link to the second command object.

14. The system of claim 12, wherein each command object is associated with a context, each context having a last command object, and wherein each command object is in either a deleted state or undeleted state, the system further comprising:

a last command object access module, for accessing a last command object of the context associated with the first command object;

a linked command object access module, for accessing a command object linked to the last command object;

a last command object deletion module, coupled to the last command object access module, for deleting the last command object; and a linked command object deletion module, coupled to the linked command object access module, for deleting the linked command object.

15. The system of claim 11, wherein the first command object comprises a link attribute pointing to the second command object, and the second command object comprises a link attribute pointing to the first command object.

16. The system of claim 11, wherein each context is associated with a last command object indicative of a last command object invoked in the context, and wherein each command object is in either a done state or an undone state, the execution synchronization module further comprising:

a last object determiner, for determining the last command object of the first context;

a first execution module, coupled to the determiner, for, responsive to the state of the last command object, executing the last command object to achieve an opposite state;

an access module, for accessing from the last command object a second command object linked thereto; and, a second execution module, coupled to the access module, for, responsive to the state of the second command object, executing the second command object to achieve an opposite state.

17. The system of claim 11, wherein each command object is in either a deleted state or undeleted state, and wherein the deletion synchronization module further comprises:

a comparator, for comparing the state of the first command object to the state of the second command object;

a selector, coupled to the comparator, for, responsive to the states of the first and second command objects not being the same, selecting the command object being in an undeleted state; and, a deletion module, coupled to the selector, for deleting the selected command object.

18. The system of claim 11, wherein the first command object is created in an active context, and the second command object is created in an inactive context.

19. The system of claim 11, wherein there are provided data objects, each data object associated with context, and wherein the command object generators further comprise:

a user operation obtainer, for obtaining a user operation having a source context and a target context;

a determiner for, responsive to the user operation being synchronous, determining whether the source context is the same as the target context;

and wherein the first command object generator, responsive to the user operation being synchronous and responsive to the source context not being the same as the target context, creates a first command object in the source context; and, and wherein the second command object generator, responsive to the user operation being synchronous, creates a command object in the target context, wherein the command object is the second command object if the source context is not the same as the target context.

20. The system of claim 11, wherein the first command object performs a drag operation, and the second command object performs a drop operation.

21. A computer-readable medium comprising computer-readable code for linking the behavior of two command objects to provide synchronous operation thereof within multiple contexts of a single application, each context comprising a mechanism for representing data to a user, the computer-readable medium comprising:

computer-readable code adapted to create a first command object for performing a first operation in a first context;

computer-readable code adapted to create a second command object for performing a different second operation in a second context;

computer-readable code adapted to link the first and second command objects such that each command object may be accessed and invoked by its linked command object;

computer-readable code adapted to synchronize execution of the first and second command objects to provide unified execution and undoing of the first and second operations such that each command object is executed when its linked command object is executed; and computer-readable code adapted to synchronize deletion of the first and second command objects such that each command object is deleted responsive to its linked command object being deleted;

wherein each command object is in either a deleted state or undeleted state, and wherein the computer-readable code adapted to synchronize deletion further comprises:

computer-readable code adapted to compare the state of the first command object to the state of the second command object;

computer-readable code adapted to, responsive to the states of the first and second command objects not being the same, select the command object being in an undeleted state; and computer-readable code adapted to delete the selected command object.

22. A computer-readable medium comprising computer-readable code for linking the behavior of two command objects to provide synchronous operation thereof within multiple contexts of a single application, each context comprising a mechanism for representing data to a user, the computer-readable medium comprising:

computer-readable code adapted to create a first command object for performing a first operation in a first context;

computer-readable code adapted to create a second command object for performing a different second operation in a second context;

computer-readable code adapted to link the first and second command objects such that each command object may be accessed and invoked by its linked command object;

computer-readable code adapted to synchronize execution of the first and second command objects to provide unified execution and undoing of the first and second operations such that each command object is executed when its linked command object is executed, the code comprising:

computer-readable code adapted to execute the first command object in the first context;

computer-readable code adapted to access the second command object by its link to the first command object; and computer-readable code adapted to execute the second command object in the second context; and computer-readable code adapted to synchronize deletion of the first and second command objects such that each command object is deleted responsive to its linked command object being deleted;

wherein each command object is associated with a context, each context having a last command object, and wherein each command object is in either a deleted state or undeleted state, the computer-readable medium further comprising:

computer-readable code adapted to access a last command object of the context associated with the first command object;

computer-readable code adapted to access a command object linked to the last command object;

computer-readable code adapted to delete the last command object; and computer-readable code adapted to delete the linked command object.

23. A computer-readable medium comprising computer-readable code for linking the behavior of two command objects to provide synchronous operation thereof within multiple contexts of a single application, each context comprising a mechanism for representing data to a user, the computer-readable medium comprising:

computer-readable code adapted to create a first command object in an active context, for performing a first operation in a first context;

computer-readable code adapted to create a second command object in an inactive context, for performing a different second operation in a second context;

computer-readable code adapted to link the first and second command objects such that each command object may be accessed and invoked by its linked command object;

computer-readable code adapted to synchronize execution of the first and second command objects to provide unified execution and undoing of the first and second operations such that each command object is executed when its linked command object is executed; and computer-readable code adapted to synchronize deletion of the first and second command objects such that each command object is deleted responsive to its linked command object being deleted.

24. A computer-readable medium comprising computer-readable code for linking the behavior of two command objects to provide synchronous operation thereof within multiple contexts of a single application, each context comprising a mechanism for representing data to a user, the computer-readable medium comprising:

computer-readable code adapted to create a first command object in an active context, for performing a first operation in a first context;

computer-readable code adapted to create a second command object in an inactive context, for performing a different second operation in a second context;

computer-readable code adapted to link the first and second command objects such that each command object may be accessed and invoked by its linked command object;

computer-readable code adapted to synchronize execution of the first and second command objects to provide unified execution and undoing of the first and second operations such that each command object is executed when its linked command object is executed; and computer-readable code adapted to synchronize deletion of the first and second command objects such that each command object is deleted responsive to its linked command object being deleted;

wherein there are provided data objects, each data object associated with context, and wherein the computer-readable code adapted to create the first and second command objects further comprises:

computer-readable code adapted to obtain a user operation having a source context and a target context;

computer-readable code adapted to, responsive to the user operation being synchronous, perform the steps of:

i) determining whether the source context is the same as the target context;

ii) responsive to the source context not being the same as the target context, creating a first command object in the source context; and, iii) creating a command object in the target context, wherein the command object is the second command object if the source context is not the same as the target context.

25. A computer-readable medium comprising computer-readable code for linking the behavior of two command objects to provide synchronous operation thereof within multiple contexts of a single application, each context comprising a mechanism for representing data to a user, the computer-readable medium comprising:

computer-readable code adapted to create a first command object performing a drag operation, for performing a first operation in a first context;

computer-readable code adapted to create a second command object performing a drop operation, for performing a different second operation in a second context;

computer-readable code adapted to link the first and second command objects such that each command object may be accessed and invoked by its linked command object;

computer-readable code adapted to synchronize execution of the first and second command objects to provide unified execution and undoing of the first and second operations such that each command object is executed when its linked command object is executed; and computer-readable code adapted to synchronize deletion of the first and second command objects such that each command object is deleted responsive to its linked command object being deleted.

* * * * *

UNITED STATES PATENT AND TRADEMARK OFFICE
CERTIFICATE OF CORRECTION

PATENT NO. : 6,757,905 B1  Page 1 of 1
DATED : June 29, 2004
INVENTOR(S) : Gregory S. Friedman and Thomas W. Becker It is certified that error appears in the above-identified patent and that said Letters Patent is hereby corrected as shown below:

Column 13,
Line 28, replace "an d" with -- and --.

Signed and Sealed this

Twenty-eighth Day of September, 2004

JON W. DUDAS
*Director of the United States Patent and Trademark Office*